US012629753B2

(12) United States Patent
Moriwaki

(10) Patent No.: US 12,629,753 B2
(45) Date of Patent: May 19, 2026

(54) COPPER POWDER, AND METHOD FOR MANUFACTURING COPPER POWDER

(71) Applicant: JX Advanced Metals Corporation, Tokyo (JP)

(72) Inventor: Kazuhiro Moriwaki, Ibaraki (JP)

(73) Assignee: JX Advanced Metals Corporation, Tokyo (JP)

( * ) Notice: Subject to any disclaimer, the term of this patent is extended or adjusted under 35 U.S.C. 154(b) by 393 days.

(21) Appl. No.: 18/022,326

(22) PCT Filed: Sep. 14, 2021

(86) PCT No.: PCT/JP2021/033803

§ 371 (c)(1),
(2) Date: Feb. 21, 2023

(87) PCT Pub. No.: WO2022/059681

PCT Pub. Date: Mar. 24, 2022

(65) Prior Publication Data

US 2023/0311207 A1 Oct. 5, 2023

(30) Foreign Application Priority Data

Sep. 15, 2020 (JP) ................................ 2020-154953

(51) Int. Cl.

| | |
|---|---|
| ***B22F 9/24*** | (2006.01) |
| ***B22F 1/054*** | (2022.01) |
| ***B22F 9/04*** | (2006.01) |
| ***H01B 1/02*** | (2006.01) |

(52) U.S. Cl.

CPC ................ *B22F 9/24* (2013.01); *B22F 1/056* (2022.01); *B22F 9/04* (2013.01); *H01B 1/02* (2013.01); *B22F 2009/044* (2013.01); *B22F 2301/10* (2013.01); *B22F 2304/058* (2013.01); *B22F 2998/10* (2013.01)

(58) Field of Classification Search

None

See application file for complete search history.

(56) References Cited

U.S. PATENT DOCUMENTS

| | | | | |
|---|---|---|---|---|
| 2004/0221685 A1* | 11/2004 | Jeong | ..................... | B82Y 30/00 75/373 |
| 2009/0029148 A1* | 1/2009 | Hashimoto | ............... | B22F 7/04 977/773 |
| 2016/0203911 A1* | 7/2016 | Furusawa | ................ | B22F 1/16 252/514 |
| 2016/0230026 A1 | 8/2016 | Furusawa | | |
| 2021/0162551 A1 | 6/2021 | Nagata et al. | | |
| 2024/0139804 A1* | 5/2024 | Akizawa | ................... | B22F 1/07 |

FOREIGN PATENT DOCUMENTS

| | | | | | |
|---|---|---|---|---|---|
| JP | 2003034802 A | * | 2/2003 | | |
| JP | 2007169770 A | * | 7/2007 | | |
| JP | 2007-197755 A | | 8/2007 | | |
| JP | 2016-138310 A | | 8/2016 | | |
| JP | 2016-191085 A | | 11/2016 | | |
| KR | 100436523 B1 | * | 6/2004 | ................ | B22F 9/24 |
| WO | WO-2019/123856 A1 | | 6/2019 | | |

OTHER PUBLICATIONS

Search Report in International Application No. PCT/JP2021/033803 dated Oct. 12, 2021, 4 pages.
Extended European Search Report in EP Application No. 21869367.9 dated Jan. 31, 2024, 9 pages.
"Fundamentals of Particle Size Measurement and Laser Diffraction Scattering Methods From an Explanation of the Principles to Precautions When Measuring With the Mastersizer", Malvern Panalytical, Jun. 17, 2019, 56 pages.
Second Office Action in CN Application No. 202180039044.3 dated Aug. 29, 2025, 15 pages.

* cited by examiner

*Primary Examiner* — Devang R Patel
(74) *Attorney, Agent, or Firm* — MARSHALL, GERSTEIN & BORUN LLP

(57) ABSTRACT

A copper powder containing copper particulates, wherein the copper powder has a number of particles with a particle size of 1.5 μm or more of 10000 or less per 10 ml of a solution, as measured in the solution using an in-liquid particle counter, the solution having a copper ion concentration of 10 g/L and being obtained by dissolving the copper particulates of the copper powder in nitric acid.

4 Claims, No Drawings

COPPER POWDER, AND METHOD FOR MANUFACTURING COPPER POWDER

FIELD OF THE INVENTION

This specification discloses a technique relating to a copper powder and a method for manufacturing a copper powder.

BACKGROUND OF THE INVENTION

Copper powder having a submicron size is powder of fine copper particulates generally having a particle size of 1 μm or less. For example, the copper powder is expected to be used for applications such as materials for inner and outer electrodes of laminated ceramic capacitors, inductors and other electronic parts, inkjet wiring, as well as conductive pastes used for bonding semiconductor elements to substrates.

This kind of copper powder can be manufactured from a raw material solution containing copper ions, such as a copper sulfate solution, by using a chemical reduction method, a disproportionation method or the like (see, for example, Patent Literature 1).

CITATION LIST

Patent Literature

[Patent Literature 1] Japanese Patent Application Publication No. 2007-169770 A

SUMMARY OF THE INVENTION

Technical Problem

For example, the application of the conductive paste requires that the conductive paste can be smoothly applied on a surface of a semiconductor element or a substrate. If the smoothness of the conductive paste is not ensured, disconnection may occur there during use.

Conventionally, it has been believed that a main reason why the required smoothness of the conductive paste cannot be achieved is due to aggregation of copper particulates in a copper powder contained in the conductive paste, and the focus has been only on suppression of the aggregation of the copper particulates. However, the present inventors have been found that even if the copper particulates are sufficiently dispersed in the conductive paste, the conductive paste does not become as smooth as desired when applied.

Based on this, the present inventors have been newly found that foreign substances other than copper particulates, which may be contaminated in the copper powder, affect the smoothness of the conductive paste.

This specification discloses a copper powder having effectively reduced foreign substances other than the copper particulates, and a method for manufacturing the copper powder.

Solution to Problem

The copper powder disclosed in this specification is a copper powder comprising copper particulates, wherein the copper powder has a number of particles with a particle size of 1.5 μm or more of 10000 or less per 10 ml of a solution, as measured in the solution using an in-liquid particle counter, the solution having a copper ion concentration of 10 g/L and being obtained by dissolving the copper particulates of the copper powder in nitric acid.

Further, the method for manufacturing a copper powder disclosed in this specification is a method for manufacturing a copper powder comprising copper particulates, the method comprising a step of filtering at least one of raw material solutions for use in the method through a filter prior to the use, wherein the filter has a collection efficiency of 95% or more for particles having a particle size of 10 μm.

Advantageous Effects of Invention

The copper powder as described above has effectively reduced foreign substances other than copper particulates. Moreover, according to the method for manufacturing the copper powder as described above, foreign substances other than copper particulates can be effectively reduced.

DETAILED DESCRIPTION OF THE INVENTION

Hereinafter, embodiments of the copper powder and the method for manufacturing the copper powder as described above will be described in detail.

A copper powder according to an embodiment includes copper particulates and has reduced foreign substances other than the copper particulates. The copper powder has a number of particles with a particle size of 1.5 μm or more of 10000 or less per 10 mL of a solution, as measured in the solution using an in-liquid particle counter, the solution being obtained by adding the copper powder to an aqueous 9% by mass nitric acid solution to dissolve the copper powder in the aqueous nitric acid solution, and having the resulting copper ion concentration of 10 g/L. It should be noted that the above copper ion concentration is calculated on the assumption that the copper powder is entirely composed of metallic copper. If the concentration of nitric acid for dissolving the copper powder is 2% by mass or less, the copper powder may not be completely dissolved, which is not preferable. It is 30% by mass or more, the dissolution reaction of the copper powder becomes severe, resulting in severe bubbling, which is not preferable in terms of safety. Based on these considerations, the aqueous 9% by mass nitric acid solution is preferable because it completely dissolves the copper powder and does not cause severe bubbling.

(Number of Particles)

When the copper particulates are dissolved in nitric acid so that the copper ion concentration of the solution having the dissolved copper particulates of the copper powder is 10 g/L, in this embodiment, the number of particles with a particle size of 1.5 μm or more, among the particles/particulates remaining undissolved in the solution, is 10000 or less per 10 mL.

The above foreign substances correspond to the particles as used herein, and remains as a solid in the above solution without being dissolved in nitric acid, and is typically made of a material that does not contain elemental copper. The foreign substances are often organic substances, dusts, silica, sand, stainless steel pieces, and the like, but they are not limited to these materials as long as they are not dissolved in nitric acid and remain in the solution.

Among such particles, the foreign substances corresponding to those having a particle size of 1.5 μm or more deteriorates smoothness during application of a conductive paste. In the conductive paste using the copper powder according to this embodiment, the particles are reduced as described above, so that the smoothness can be significantly improved.

From this point of view, the number of particles is preferably 7000 or less per 10 mL. As the number of particles with a particle size of 1.5 μm or more is lower, the smoothness is more improved. Therefore, there is no preferred lower limit for the number of particles, but in many cases, the number of particles is 50 or more, and even 100 or more, per 10 mL.

More particularly, the number of particles can be measured as follows. First, 1.000±0.005 g of copper powder is put into a container having a volume of 100 mL (Sampler (R) PP bottle with wide mouth, product number 2043, from SAMPLATECH CORPORATION), and 10 mL of filtered pure water is added thereto. Furthermore, 90 mL of an aqueous 10% by mass nitric acid solution filtered is added thereto to dissolve the copper particulates in the copper powder. A solution having a copper ion concentration of 10 g/L is thus obtained. A 40 mm size stirrer is placed there, and stirred at 300 rpm. After stirring for 1 minute, a suction hose of an in-liquid particle counter (KS-42C, from Rion) is inserted, and the number of particles in the solution is measured a rated flow rate (a flow rate during measurement) of 10 mL/min. The measurement is performed with stirring at 300 rpm. The liquid volume per one measurement is 10 mL, three measurements are continuously performed, and an average value thereof is determined to be the number of particles. The aqueous 10% by mass nitric acid solution can be prepared by mixing 833 g of pure water with 167 g of 60% by mass nitric acid.

When measuring the number of particles, all instruments used for the measurement are washed with pure water filtered through a 0.1 μm membrane filter. The nitric acid and pure water used for dissolving the copper particulates of the copper powder are also filtered through the 0.1 μm membrane filter. It is previously confirmed that the filtered aqueous nitric acid solution and pure water have the number of particles with a particle size of 1.5 μm or more per 10 mL of 150 or less using the in-liquid particle counter as described above. The membrane filter that can be used herein includes a filter having a collection efficiency of 95% or more for particles having a particle size of 10 μm.

The in-liquid particle counter can be calibrated in advance using spherical polystyrene latex (PSL) particles that have been quantified by a transmission electron microscope (TEM). In addition to the transmission electron microscopy (TEM) method described above, a counting millikan particle absolute measurement method or an optical microscopy method may be used in order to quantify spherical polystyrene latex (PSL) particles.

(Particle Size)

The particle size of the copper powder is preferably 0.1 μm to 1.0 μm, particularly 0.2 μm to 0.5 μm. If the particle size of the copper powder is too large, there is a concern that it may not be satisfactorily used for predetermined applications such as internal and external electrode materials, inkjet wiring, and conductive pastes. On the other hand, if the particle size of the copper powder is too small, the copper powder tends to aggregate in the paste, which is not preferable.

The particle size of the copper powder can be measured as follows. The copper powder is observed with a scanning electron microscope (SEM) at magnifications of 20000 times, and the resulting SEM image is imported into image analysis software (Image Fiji). The particle size of 15 particulates is randomly measured with the image analysis software, and an average value of 13 particulates excluding the maximum and minimum values of the particle sizes is determined to be the particle size of the copper powder.

(Composition)

The copper powder mainly contains copper particulates, and in some cases may further contain a predetermined surface treatment agent such as a coupling agent.

The copper powder may contain chlorine, but chlorine may be an impurity. Therefore, a lower content of chlorine is desirable. More particularly, the chlorine content in the copper powder is preferably less than 10 ppm by mass. Such a low chlorine content in the copper powder can be achieved, for example, by manufacturing the copper powder using cuprous oxide having a low chlorine content. The chlorine content in the copper powder can be measured by combustion-ion chromatography. In this measurement method, a copper powder sample is thermally decomposed in an argon carrier gas, and then burned in an oxygen gas, and the released chlorine is collected in an absorbent solution, introduced into an ion chromatograph, and analyzed. In this case, AQF 2100H from Mitsubishi Chemical Analytech and Integrion RFIC from Thermo Fisher Scientific can be used.

(Application)

The copper powder as described above is mixed with a resin material, a dispersion medium, or the like to form a paste, which is particularly suitable as a conductive paste or the like that can be used for bonding a semiconductor element to a substrate. Alternatively, it can be suitably used as a material for inner and outer electrodes of electronic parts such as laminated ceramic capacitors and inductors, and for inkjet wiring.

(Manufacturing Method)

The copper powder as described above can be manufactured by applying a chemical reduction method or a disproportionation method to a raw material solution containing copper ions.

In the case of the chemical reduction method, for example, the following steps are included in order: a step of preparing an aqueous copper salt solution (a raw material solution containing copper ions), an aqueous alkaline solution, and an aqueous reducing agent solution, or the like, as raw material solutions; and a step of mixing these raw material solutions to obtain a slurry containing copper particulates; a step of washing the copper particulates by decantation or the like; a step of performing solid-liquid separation; and a drying step.

In a more specific example, gum arabic is added to pure water, copper sulfate is then added, and an aqueous sodium hydroxide solution and an aqueous hydrazine solution are added with stirring. After the addition, the temperature is increase to react the copper oxide. After completion of the reaction, the resulting slurry is filtered through Nutsche, then washed with pure water and methanol, and further dried. The copper powder is thus obtained.

An embodiment of the manufacturing method using the disproportionation method may include, for example, a step of preparing an aqueous copper salt solution (a raw material solution containing copper ions), an aqueous alkaline solution, and an aqueous reducing agent solution, or the like, as raw material solutions; a step of mixing these raw material solutions to obtain a slurry containing cuprous oxide particulates; a step of washing the cuprous oxide particulates by decantation or the like; a step of bringing the slurry containing cuprous oxide particulates into contact with sulfuric acid to obtain a slurry containing copper particulates; a step of washing the copper particulates; a step of performing solid-liquid separation; and a drying step, in this order. If commercially available or existing cuprous oxide particulates are used, the above method may be started with the step of bringing the slurry containing cuprous oxide particulates into contact with sulfuric acid.

In a specific example, the cuprous oxide particulates are added to an aqueous solvent containing an additive dispersant (e.g., gum arabic, gelatin, collagen peptide) to prepare a slurry containing the cuprous oxide particulates, and to the slurry is added dilute sulfuric acid at once within 5 seconds to perform disproportionation reaction. The disproportionation reaction is represented by the formula: $Cu_2O+H_2SO_4 \rightarrow Cu\downarrow+CuSO_4+H_2O$.

Here, it is preferable to adjust the pH to 1.5 or less by adding dilute sulfuric acid.

It should be noted that in the production using the chemical reduction method or the disproportionation method, an aqueous solution of copper sulfate or copper nitrate can be used as the aqueous copper salt solution. The aqueous alkaline solution may specifically be an aqueous solution of NaOH, KOH, $NH_4OH$, or the like. The reducing agent for the aqueous reducing agent solution includes hydrazine and the like.

Regardless of which of the chemical reduction method and the disproportionation method described above is used, the manufacturing method of this embodiment further includes a step of previously filtering the raw material solutions used for the manufacturing method prior to the use, through a filter having a collection efficiency of 95% or more for particles having a particle size of 10 μm. The raw material solution is at least one selected from the group consisting of the aqueous copper salt solution, the aqueous alkaline solution and the aqueous reducing agent solution. That is, in this step, the aqueous copper salt solution, the aqueous alkaline solution and/or the aqueous reducing agent solution are filtered through the above filter.

According to this, the foreign substances that may be contained in the raw material solution is removed in advance, so that it is possible to prevent the foreign substances from being brought and contaminated into the copper powder obtained later. As a result, the copper powder with effectively reduced foreign substances can be manufactured.

In addition, after mixing two or more of the aqueous copper salt solution, the aqueous alkaline solution, and the aqueous reducing agent solution, the mixture may be filtered through the above filter. Also, an aqueous solution containing two or more selected from the group consisting of copper salts, alkalis and reducing agents also corresponds to the raw material solution as used herein. More preferably, all the raw material solutions (for example, all of the aqueous copper salt solution, the aqueous alkaline solution and the aqueous reducing agent solution) are filtered through the filter described above.

The filter used here has a collection efficiency of 95% or more for particles having a particle size of 10 μm. Information on such a collection efficiency is retained or disclosed by various filter manufacturers as items or specifications of their respective filters. Based on this, the filter having a collection efficiency of 95% or more for the particles having a particle size of 10 μm can be available.

In many cases, a cartridge filter is preferably used as the above filter.

Also, from the viewpoint of further suppressing the contamination of the foreign substances, it is preferable that a washing liquid such as pure water used in the step of washing the cuprous oxide particulates or copper particulates described above is previously filtered through the filter having a collection efficiency of 95% or more for the particles having a particle size of 10 μm. That is, the above embodiment preferably includes the step of washing the cuprous oxide particulates or copper particulates using the washing liquid filtered through the filter.

More particularly, in the embodiment using the chemical reduction method as described above, in the step of washing the copper particulates after the step of obtaining the slurry containing copper particulates, or in the embodiment using the disproportionation method as described above, in the step of washing the cuprous oxide particulates after the step of obtaining the slurry containing the cuprous oxide particulates and/or in the step of washing the copper particulates after the step of obtaining the slurry containing the copper particulates, the washing liquid after filtration through the filter can be used. When it includes both the step of washing the cuprous oxide particulates and the step of washing the copper particulates, as in the disproportionation method, it is more preferable to use the washing liquid filtered through the above filter in both of the steps.

Further, sulfuric acid to be brought into contact with the slurry containing cuprous oxide particulates in the disproportionation method is preferably filtered in advance through the filter having a collection efficiency of 95% or more for the particles having a particle size of 10 μm. This can lead to removal of the foreign substances that may be contained in sulfuric acid.

EXAMPLES

Next, the manufacturing method as described above was experimentally produced and the effects thereof were confirmed, as described below. However, the descriptions herein are merely illustrative and are not intended to be limited thereto.

Example 1

The copper powder was manufactured by the disproportionation method. Here, a solution A obtained by filtering an aqueous copper sulfate solution through a cartridge filter (from JNC Filter Co.; model number: CP-01; nominal pore size: 1 μm) and a solution B obtained by filtering an aqueous mixed solution of sodium hydroxide and hydrazine hydrate through the same cartridge filter were mixed to obtain a cuprous oxide slurry. The cuprous oxide slurry was washed by decantation using pure water as a washing liquid filtered through the same cartridge filter. It was then dried by vacuum heating to obtain powdery cuprous oxide. The cuprous oxide thus obtained had a chlorine content of less than 10 mass ppm and an average particle size D50 of 2.42 μm. The average particle size D50 means a particle size at which a frequency accumulation on a volume basis is 50% in a particle size distribution graph obtained by measurement with a laser diffraction/scattering particle size distribution analyzer.

The cuprous oxide (10 kg) was mixed with pure water (46 kg) as a washing liquid filtered through the same cartridge filter as above, and to which an aqueous gum arabic solution (4 kg) obtained by dissolving gum arabic (480 g) in pure water (30 L) and filtered through the cartridge filter was added to prepare a cuprous oxide slurry A. Subsequently, sulfuric acid (22.2 kg) filtered through the same cartridge filter was brought into contact with the cuprous oxide slurry A to obtain a copper slurry A. The copper slurry A was then washed three times by decantation using pure water as a washing liquid filtered through the cartridge filter, and the above aqueous gum arabic solution (3.3 kg) as described above was added during the third washing, subjected to solid-liquid separation by means of a filter press, and dried by vacuum heating. Further, it was then pulverized by a jet mill to obtain a copper powder.

The cartridge filter (from JNC Filter; model number: CP-01; nominal pore size: 1 μm) used in Example 1 has a collection efficiency of 95% for the particles having a particle size of 10 μm.

Example 2

Copper powder was manufactured by the chemical reduction method. More particularly, copper sulfate pentahydrate (2400 g) and citric acid (30 g) were dissolved in pure water (8700 g), and this was filtered through a cartridge filter (from Advantech; model number: TCSE-E010S; nominal pore size: 0.1 μm) to obtain a solution C. Also, a mixed solution of 10% by mass of sodium hydroxide (5400 g) and 10% by mass of hydrazine (1440 g) was filtered through the same cartridge filter to obtain a solution D. The solution C and the solution D were mixed to obtain a cuprous oxide slurry B. A mixed solution of 10% by mass of sodium hydroxide (2616 g) and 10% by mass of hydrazine (1440 g) was filtered through the same cartridge filter to obtain a solution E. The cuprous oxide slurry B and the solution E were mixed to obtain a copper slurry B. The copper slurry B was then washed by decantation using pure water as a washing liquid filtered through the same cartridge filter, subjected to solid-liquid separation by a centrifugal separator, and dried by vacuum heating. It was then pulverized by a jet mill to obtain a copper powder.

The above cartridge filter (from Advantech; model number: TCSE-E010S; nominal pore size: 0.1 μm) used in Example 2 has a collection efficiency of 95% or more for the particles having a particle size of 10 μm. The collection efficiency was measured using polystyrene latex sphere-dispersed water as a test liquid.

Examples 3 and 8

In each of Examples 3 and 8, a copper powder was manufactured by substantially the same method as that of Example 1, with the exception that characteristics such as the particle size of the cuprous oxide used for manufacturing the copper powder were slightly different from those of Example 1.

Examples 4 to 7

In each of Examples 4 to 7, a copper powder was manufactured by the same method as that of Example 1, with the exception that the cuprous oxide slurry A was brought into contact with 22.5 kg of sulfuric acid. Although substantially the same conditions were used in Examples 4 to 7, the resulting copper powders were slightly different from each other as shown in Table 3.

Comparative Example 1

A copper powder was manufactured by the same method as that of Example 1, with the except that none of the solutions, the washing liquid, and sulfuric acid was filtered using the cartridge filter.

(Evaluation)

For each copper powder according to Examples 1 to 8 and Comparative Example 1, the number of particles, chlorine content and particle size (SEM size) were measured according to the methods described above. The in-liquid particle counter (KS-42C from Rion Co., Ltd.) used was calibrated using standard particles. The standard particles used for calibration are as follows:

(Standard particles used for calibration of the in-liquid particle counter KS-42C)

Product name: JSR SIZE STANDARD PARTICLES SC-052-S, an average particle size: 0.498±0.003 μm;

Product name: JSR SIZE STANDARD PARTICLES SC-103-S, an average particle size: 1.005±0.021 μm;

Product name: JSR SIZE STANDARD PARTICLES SC-201-S, an average particle size: 2.052±0.071 μm;

Product name: DYNOSPHERES SS-033-P, an average particle size: 3.344±0.191 μm;

Product name: DYNOSPHERES SS-053-P, an average particle size: 5.124±0.115 μm;

Product name: DYNOSPHERES SS-104-P, an average particle size: 10.14±0.186 μm;

Product name: DYNOSPHERES SS-204-P, an average particle size: 19.83±0.201 μm.

The calibration channels built in the device that were detected using the standard particles described above are shown in Table 1, and the set channels for each particle classification set from the results are shown in Table 2.

Table 3 shows the measurement results of the number of particles, chlorine content and particle size (SEM diameter).

TABLE 1

| PSL Particle Size and Calibration Channel | | | | | | | |
|---|---|---|---|---|---|---|---|
| | PSL Particle Size (μm) | | | | | | |
| | 0.498 | 1.005 | 2.052 | 3.344 | 5.124 | 10.14 | 19.83 |
| Calibration Channel | 45436 | 693243 | 57088 | 143264 | 222281 | 847096 | 2901387 |

TABLE 2

| Particle Size Classification and Set Channel* | | | | | | | |
|---|---|---|---|---|---|---|---|
| | Particle Size Classification (μm) | | | | | | |
| | 0.5 | 1 | 2 | 3 | 5 | 10 | 20 |
| Set Channel | 46299 | 684924 | 54519 | 125769 | 226949 | 842013 | 2947809 |

*Channel at Bult-in Pulse Height Analysis Portion number of streaks in the evaluation result was assumed to be 0, and the average value of the number of streaks was calculated, and the average value of the position where the first streak appeared was calculated without taking the evaluation results into account, and the average value of the streak positions was determined as n number obtained by subtracting the number of streaks in the evaluation results from the total number (6). It can be said that the smaller the number of streaks, the smaller the number of coarse particles (foreign substances or aggregates) in the copper paste, and the smoother the copper paste. Also, the size of the coarse particles corresponding to the position where the first streak is formed corresponds to the largest coarse particles contained in the copper paste, and it can be said that the smaller the size of the largest coarse particles, the smoother the copper paste. The results are also shown in Table 3.

TABLE 3

| | Number of Particles (Number/10 mL) | | | | | | Grind Gauge Evaluation | | | Particle |
|---|---|---|---|---|---|---|---|---|---|---|
| | ≥1.5 μm | ≥2.0 μm | ≥5.0 μm | ≥10.0 μm | ≥15.0 μm | ≥20.0 μm | Number of Streaks | First Streak Position (μm) | Cl Content (mass ppm) | Size (μm) |
| Ex. 1 | 6339 | 2157 | 210 | 24 | 6 | 2 | 1.0 | 9.8 | <10 | 0.39 |
| Ex. 2 | 809 | 324 | 64 | 13 | 3 | 2 | 1.0 | 12.8 | <10 | 0.39 |
| Ex. 3 | 3275 | 982 | 100 | 15 | 3 | 2 | 0.2 | 3.0 | <10 | 0.25 |
| Ex. 4 | 3076 | 1042 | 95 | 12 | 3 | 1 | 1.0 | 8.0 | 10 | 0.48 |
| Ex. 5 | 2273 | 659 | 80 | 19 | 7 | 1 | 0.0 | 0.0 | 11 | 0.43 |
| Ex. 6 | 4783 | 1499 | 250 | 32 | 8 | 2 | 0.0 | 0.0 | <10 | 0.36 |
| Ex. 7 | 4879 | 1798 | 172 | 13 | 1 | 0 | 0.5 | 18.8 | 10 | 0.4 |
| Ex. 8 | 3984 | 1366 | 145 | 25 | 6 | 3 | 0.7 | 12.3 | 10 | 0.4 |
| Comp. 1 | 22305 | 5738 | 456 | 66 | 17 | 7 | 3.0 | 14.1 | <10 | 0.33 |

Further, each copper powder was subjected to the following grind gauge evaluation. The copper powder, terpineol, ethyl cellulose and oleic acid were mixed and kneaded so as to have a weight ratio of 80:16.1:2.6:1.3. The mixture was then passed through a three-roll mill with a gap width set to 5 μm to obtain a copper paste. On a grind gauge table with grooves gradually shallower from 25 μm to 0 μm in depth, a sufficient amount of copper paste was poured into an end on the deep groove side, and moved from the end on the deep groove side to an end on the shallow groove side while pressing a squeegee against the top of the table. Subsequently, the number of linear scratches (streaks) appearing in the copper paste at the positions deeper than a groove depth of 5 μm, and among them, a position on the deepest groove (start point position) side where the first streak appeared, were visually observed. The grind gauge evaluation was performed six times for each copper powder, and an average value of the numbers of streaks in the six evaluations and an average value of the positions where the first streaks appeared were calculated. In addition, if there was an evaluation result in which no streak appeared at all, the As shown in Table 3, it is found that in Comparative Example 1, the number of particles having a particle size of 1.5 μm or more was relatively large, whereas in each of Examples 1 to 8, the number of particles having a particle size of 1.5 μm or more is reduced by performing the filtration through the predetermined filter. In particular, in Example 2, the number of particles was further reduced because the filter collection efficiency was higher than that used in each of Examples 1 and 3 to 8.

Further, in each of Examples 1 to 8, the number of streaks in the grind gauge evaluation was reduced as compared to Comparative Example 1. Further, the position of the first streak in each of Examples 1 to 6 and 8 was smaller than that in Comparative Example 1. In Example 7, the streak position was slightly large, but since the number of streaks was smaller, it is presumed that the streak position became slightly large due to accidental catching of large foreign substances.

In view of the foregoing, it was found that foreign substances other than the copper particulates can be effectively reduced by the method for manufacturing the copper powder as described above.

The invention claimed is:

1. A copper powder comprising copper particulates, wherein the copper powder has a number of particles with a particle size of 1.5 μm or more of 50 or more and 10000 or less per 10 mL of a solution, as measured in the solution using an in-liquid particle counter, the solution having a copper ion concentration of 10 g/L and being obtained by dissolving the copper particulates of the copper powder in nitric acid, and wherein the particles are particles with a particle size of 1.5 μm or more that remain undissolved in the solution.

2. The copper powder according to claim 1, wherein the number of particles is 7000 or less per 10 mL.

3. A method for manufacturing a copper powder comprising copper particulates, the method comprising the following steps in order:

filtering at least one of raw material solutions through a filter, wherein the filter has a collection efficiency of 95% or more for particles having a particle size of 10 μm, and wherein the at least one of the raw material solutions includes at least one of an aqueous copper salt solution, an aqueous alkaline solution, and an aqueous reducing agent solution;

obtaining a slurry containing copper particulates from the at least one of the raw material solutions; and washing the slurry with a washing liquid filtered through a filter having a collection efficiency of 95% or more for particles having a particle size of 10 μm.

4. The method according to claim 3, further comprising the steps of: obtaining a slurry containing cuprous oxide particulates from the at least one of the raw material solutions.

* * * * *